United States Patent
Alcime et al.

(10) Patent No.: US 10,842,142 B2
(45) Date of Patent: Nov. 24, 2020

(54) MOSQUITO AGITATION DEVICE, SYSTEM AND METHOD

(71) Applicants: Edwena Tamara Alcime, Lauderdale Lakes, FL (US); Kayla Elizabeth Campbell, Tamarac, FL (US); Marissa Royanna Castro, Fort Lauderdale, FL (US); Claire Marie Cole, Tamarac, FL (US); Marie Natalie Dorvilus, Lauderdale Lakes, FL (US); Paul Dominic Fucile, Waquoit, MA (US); Aidan Tidus Kelly, Pompano Beach, FL (US); Lise Clara Mabour, Pompano Beach, FL (US); Angela Marie Riofrio, Fort Lauderdale, FL (US); Coleen Elizabeth Sailsman, Lauderhill, FL (US); Harold Eduardo Sarmiento Trujillo, Pompano Beach, FL (US); Halle Elizabeth Shelton, Hollywood, FL (US)

(72) Inventors: Edwena Tamara Alcime, Lauderdale Lakes, FL (US); Kayla Elizabeth Campbell, Tamarac, FL (US); Marissa Royanna Castro, Fort Lauderdale, FL (US); Claire Marie Cole, Tamarac, FL (US); Marie Natalie Dorvilus, Lauderdale Lakes, FL (US); Paul Dominic Fucile, Waquoit, MA (US); Aidan Tidus Kelly, Pompano Beach, FL (US); Lise Clara Mabour, Pompano Beach, FL (US); Angela Marie Riofrio, Fort Lauderdale, FL (US); Coleen Elizabeth Sailsman, Lauderhill, FL (US); Harold Eduardo Sarmiento Trujillo, Pompano Beach, FL (US); Halle Elizabeth Shelton, Hollywood, FL (US)

(*) Notice: Subject to any disclaimer, the term of this patent is extended or adjusted under 35 U.S.C. 154(b) by 134 days.

(21) Appl. No.: 16/221,324

(22) Filed: Dec. 14, 2018

(65) Prior Publication Data
US 2020/0187483 A1    Jun. 18, 2020

(51) Int. Cl.
*A01M 1/00* (2006.01)
*A01M 1/20* (2006.01)
*A01M 1/22* (2006.01)

(52) U.S. Cl.
CPC .......... *A01M 1/205* (2013.01); *A01M 1/2033* (2013.01); *A01M 1/22* (2013.01); *A01M 2200/012* (2013.01)

(58) Field of Classification Search
CPC .... A01M 1/106; A01M 1/205; A01M 1/2033; A01M 1/226; A01M 2200/012; C02F 1/36; C02F 2201/009; C02F 2209/005
(Continued)

(56) References Cited

U.S. PATENT DOCUMENTS 5,815,980 A * 10/1998 Clarke, Jr. .............. A01M 1/04
  43/113
6,298,011 B1 * 10/2001 Nyberg ................. A01M 1/226
  367/139
(Continued)

*Primary Examiner* — Yvonne R Abbott-Lewis

(57) ABSTRACT

A mosquito agitator system and method to disrupt the development of mosquito larvae in bodies of water are disclosed. The mosquito agitator, in one embodiment, includes a motor coupled to a rotating shaft that is coupled to a non-symmetric mass; a hull coupled to the motor; one or more solar panels coupled to the hull for capturing solar energy into electricity; a plurality of sensors; and a controller coupled to at least the motor, wherein the controller is configured to receive sensor data from the plurality of sensors; select a first mosquito agitator algorithm for execution; and execute the first mosquito agitator algorithm to control activate the motor in accordance with the first (Continued)

mosquito agitator algorithm, wherein the activation causes the hull to create a plurality of water ripples in the body of water to disrupt the development of mosquito larvae.

20 Claims, 15 Drawing Sheets

(58) Field of Classification Search
USPC .......................................... 43/132.1; 367/139
See application file for complete search history.

(56) References Cited

U.S. PATENT DOCUMENTS

| 9,856,020 | B1* | 1/2018 | Gordon | G06K 9/6267 |
| 9,944,541 | B2* | 4/2018 | Marka | C02F 1/36 |
| 2010/0229458 | A1* | 9/2010 | Bowden | A01M 1/106 |
| | | | | 43/107 |

\* cited by examiner

MOSQUITO AGITATION DEVICE, SYSTEM AND METHOD

TECHNICAL BACKGROUND

Mosquito-borne illnesses are a worldwide problem faced by millions of people. Among others, mosquitoes carry diseases such as malaria, West Nile virus, filariasis, tularemia, dirofilariasis, Japanese encephalitis, Saint Louis encephalitis, Western equine encephalitis, Eastern equine encephalitis, Venezuelan equine encephalitis, Ross River fever, Barmah Forest fever, La Crosse encephalitis, and Zika fever. Because of an increasing growth of mosquitoes all over the world, including in densely populated areas, the number of illnesses that have been linked to mosquitoes continues to grow. It has been estimated that nearly 800 million people contract at least one mosquito-borne illnesses each year. Indeed, it is estimated that every minute a child dies from malaria and according to the Centers for Disease Control and Prevention (CDC), 400 million people are infected with Dengue fever yearly.

Mosquito-borne illnesses are especially prevalent in tropical and subtropical regions, where mosquitoes thrive because of the ideal climate and availability of areas with which to efficiently develop larvae. These insects most commonly infest ponds, marshes, swamps, and other wetland habitats. Generally, mosquitoes have two habitat types, the permanent water mosquitoes, and the floodwater mosquitoes. Permanent water mosquitoes lay their 50-300 eggs on standing water while floodwater mosquitoes lay up to 200 eggs in moist soil. Florida floodwater mosquito species are *Culex nigripalpus, Ochlerotatus taeniorhyncus*, and *Psorophora columbiae*, while the permanent water mosquito species include *Anopheles quadrimaculatus, Culex quinquefasciatus*, and *Mansonia dyari*. Permanent water mosquitoes are most active when the average degree is above 80 Fahrenheit and these mosquitoes can breed in containers like kiddie pools, buckets, or toys left outside and for the egg to survive it must stay in the water and they usually hatch in 24 hours. On the other hand, floodwater mosquitoes can lay eggs in moist areas of pastures, swales, salt-marsh, and citrus furrows and when these areas fill with water the eggs are able to hatch (Mosquito Habitats). In Florida and the South, all of these environments exist in abundance, leaving whole areas susceptible to invasions of mosquitoes and mosquito-borne illnesses.

There are thousands of different mosquito species that are vectors, but the most dangerous mosquito types include the Aedes mosquitoes, which live in tropical, subtropical, and some temperate climates. These mosquitoes are responsible for the spread of the Zika virus, dengue fever, chikungunya, West Nile fever, and eastern equine encephalitis. For instance, *Anopheles stephensi* is the main vector of malaria in urban India while the *Anopheles gambiae*, the most efficient vectors of malaria in the world lives in the African tropics. Lastly, *Aedes triseriatus* is the primary vector of La Crosse virus, which causes a form of encephalitis. A couple of common mosquito species in South Florida include the black salt marsh mosquito, the Asian tiger mosquito, *Psorophora ciliata*, and the *Culex quinquefasciatus*. The black salt marsh mosquitoes, or *Aedes taeniorhynchus* can transmit the Zika virus, the Asian tiger mosquito, *Aedes albopictus* is a vector for dengue fever, the *Psorophora ciliata* mosquito carries the equine encephalitis virus, and the *Culex quinquefasciatus* species is a vector of the human encephalitis virus. While mosquito-vectored diseases impact regions all around the world, especially South America, Asia, and Africa, they disproportionately impact people living on the continent of Africa, where 90% of the worlds cases of malaria related deaths are reported (Foley, et al., 2007), many of which are located in tropical or subtropical climates.

Accordingly, there is a need to control the mosquito population through one or more means. The benefit of a solution would potentially result in lower rate of protraction of mosquito-borne illness. A smaller population of mosquitoes, after all, would mean that there are less mosquitoes that could carry diseases between hosts, thereby lowering the spread of communicable diseases and deaths.

Certain attempts have been made to create a solution that would control or lower the rate of mosquito-borne diseases. For example, some efforts have been made to create and spread the use of insecticidal nets and indoor residual spraying to prevent the contraction of diseases carried by mosquitoes. However, these solutions have limited use cases, as they only prevent mosquitoes from entering homes or other areas. People traveling outside of the areas protected by the nets or the sprays are still at risks. Furthermore, the solutions do not offer full protection as tears in the nets may still allow mosquitoes to enter the area. Finally, items like mosquito nets and bugs prays provide some relief but are remedies for a symptom of the mosquito problem, not the cause.

In addition, mosquito programs and mosquito control groups, like Miami-Dade's Drain and Cover Program, have urged the exercise of preventive measures to prevent the habitation of mosquitoes, larvae etc. For example, these programs have recommended to homeowners that they flip over containers of standing water in their yards. However, with an abundance of floodwater, mosquitoes wait for a storm to hatch in droves of up to one million mosquitoes per acre, such preventative measures have minimal impact.

Another solution that has been used in the battle against mosquito-borne illnesses is vaccines. However, of the many types of viruses and other diseases that could be carried by mosquitoes, there are many types that do not have a vaccines or vaccines that do not adequately stop the viruses. Even in cases where vaccines have been developed, many people in third-world countries often do not have access to such vaccines and associated medical care. Furthermore, these vaccines often come with side-effects and other negative attributes that prevent the use of vaccines by certain portions of the population.

Other developed solutions include chemicals and biological agents, and aerators. These solutions, however, require precise maintenance, often harm other wildlife, change the physical state of the environment, and are costly. For example, chemical agents can change the chemical and physical state of the water and can alter the living conditions for other organisms in the water.

Accordingly, there remains a need for a solution to prevent continued growth of the mosquito population and to reduce the transmission of deadly mosquito borne diseases. There is a need to reduce the death tolls and rates of infection globally. Furthermore, there is a need to a solution that would better serve communities near bodies of stagnant water (ponds, marshes, lakes, retention ponds, detention ponds, and swamps/wetlands) or with man-made containers or flooded areas that accrue large amounts of mosquito eggs, larva, and pupa (shipping containers, dumpsters, drainage areas).

OVERVIEW

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

Briefly stated, the disclosed technology is generally directed to mosquito agitator system and method. The mosquito agitator, in one embodiment, includes a motor coupled to a rotating shaft that is coupled to a non-symmetric mass; a hull coupled to the motor; one or more solar panels coupled to the hull for capturing solar energy into electricity; a plurality of sensors; and a controller coupled to at least the motor, wherein the controller is configured to receive sensor data from the plurality of sensors; select a first mosquito agitator algorithm for execution; and execute the first mosquito agitator algorithm to control activate the motor in accordance with the first mosquito agitator algorithm, wherein the activation causes the hull to create a plurality of water ripples in the body of water to disrupt the development of mosquito larvae.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

Figure 1:
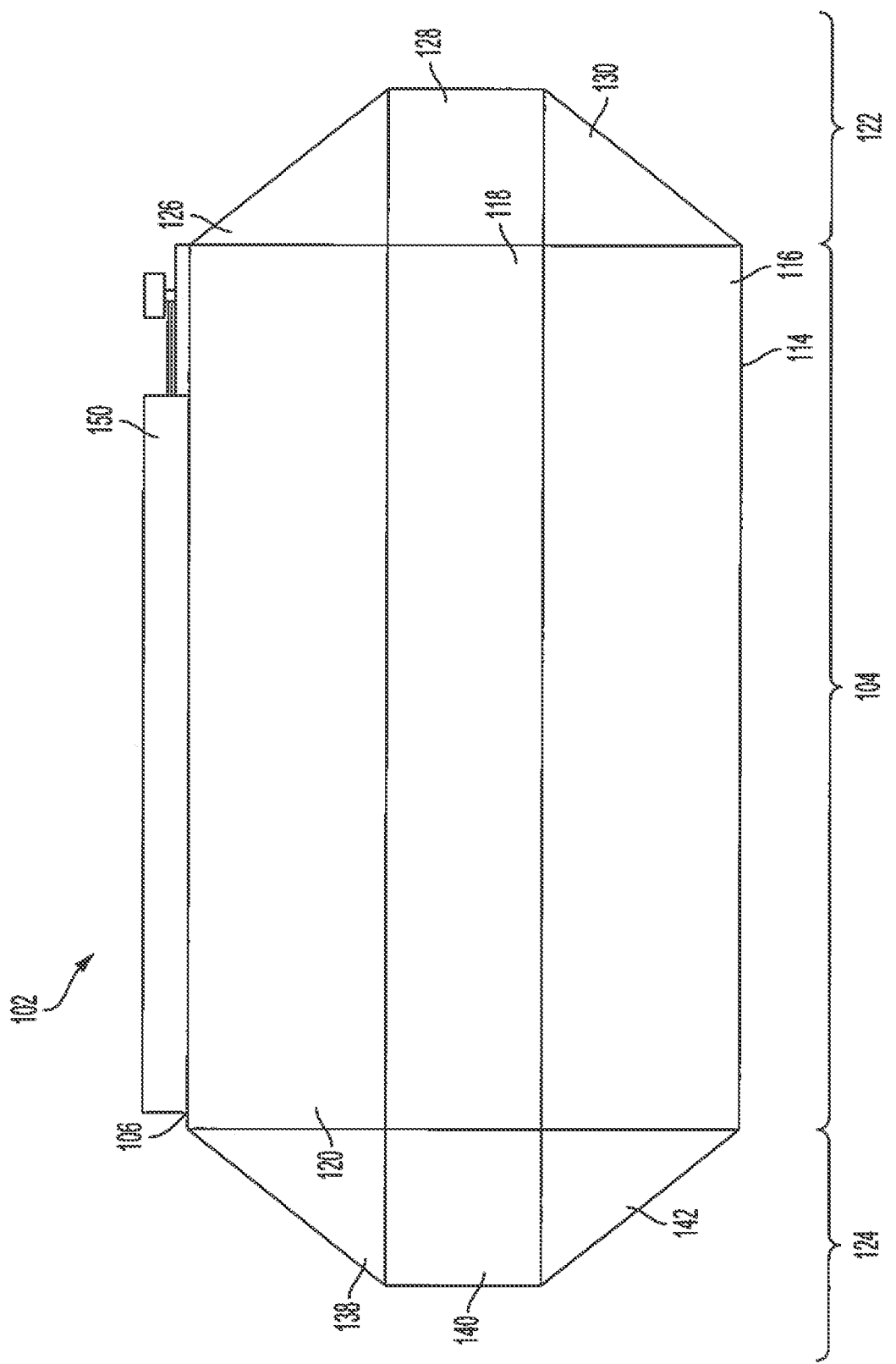
FIG. 1 illustrates a side view of a mosquito agitator in accordance with one embodiment of the present invention.

The following description provides specific details for a thorough understanding of, and enabling description for, various examples of the technology. One skilled in the art will understand that the technology may be practiced without many of these details. In some instances, well-known structures and functions have not been shown or described in detail to avoid unnecessarily obscuring the description of examples of the technology. It is intended that the terminology used in this disclosure be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section. Throughout the specification and claims, the following terms take at least the meanings explicitly associated herein, unless the context dictates otherwise. The meanings identified below do not necessarily limit the terms, but merely provide illustrative examples for the terms. For example, each of the terms "based on" and "based upon" is not exclusive, and is equivalent to the term "based, at least in part, on", and includes the option of being based on additional factors, some of which may not be described herein. As another example, the term "via" is not exclusive, and is equivalent to the term "via, at least in part", and includes the option of being via additional factors, some of which may not be described herein. The meaning of "in" includes "in" and "on." The phrase "in one embodiment," or "in one example," as used herein does not necessarily refer to the same embodiment or example, although it may. Use of particular textual numeric designators does not imply the existence of lesser-valued numerical designators. For example, reciting "a widget selected from the group consisting of a third foo and a fourth bar" would not itself imply that there are at least three foo, nor that there are at least four bar, elements. References in the singular are made merely for clarity of reading and include plural references unless plural references are specifically excluded. The term "or" is an inclusive "or" operator unless specifically indicated otherwise. For example, the phrases "A or B" means "A, B, or A and B." As used herein, the terms "component" and "system" are intended to encompass hardware, software, or various combinations of hardware and software. Thus, for example, a system or component may be a process, a process executing on a computing device, the computing device, or a portion thereof.

Disclosed herein are embodiments of a mosquito agitation systems and methods. Embodiments of the present invention addresses the above-described needs and overcome the deficiencies of the prior art. The embodiments described herein may provide a solution that disturb the surface tension of stagnant water, making it difficult for mosquitoes to lay eggs and/or for pupae to transition into the adult stage. In certain embodiments, the device is an elongated octagonal shape. In at least one embodiment, the device's structure is 13 inches in length, and 7 inches tall, and 8 inches wide to accommodate the two 5 by 6-inch solar cells and the internal components.

Embodiments may utilize a microcontroller to rotate a gearmotor with a counterweight to create disturbances on the water's surface. In at least one embodiment, a motor may operate based on one or more cycles, such as for 5 mins every 6 hours to detach egg rafts or mosquito pupae from the water's surface. In at least one embodiment, the device is powered by solar and battery energy. Embodiments may collect and interprets temperature, movement, and light to allow the Mosquito Agitator to conserve energy and control the motor to best match the conditions in its environment. Embodiments of the present invention may be manufactured with any number of materials, including, high quality plastics, aluminum, wood, carbon fiber and others. Embodiments of the present invention may further be designed to sustain in the environment for a prolong period with minimal maintenance.

Embodiments of the present invention may effectively control the mosquito population lakes, ponds and other outdoor bodies of water. With embodiments of the present invention, the disclosed invention may address the much-needed public health initiatives to reduce the spread of mosquito illnesses and reduce the number of deaths associated with mosquitoes.

Figure 2:
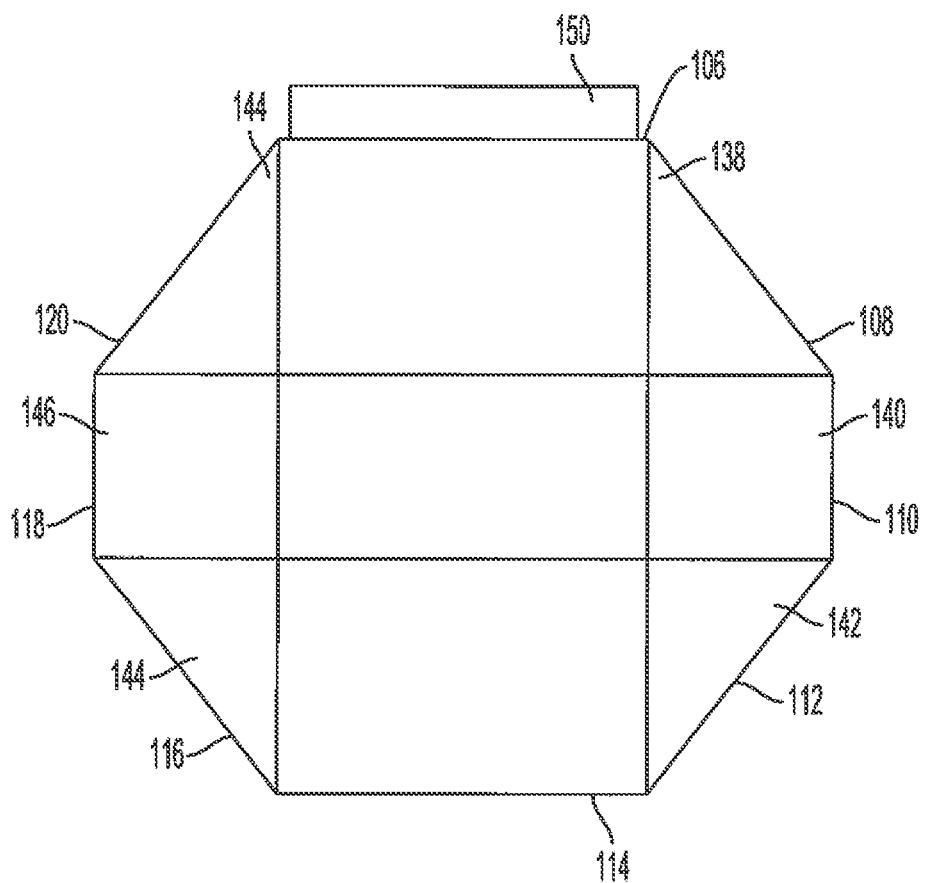
FIG. 2 illustrates a front/longitudinal view of the mosquito agitator in accordance with an embodiment of the present invention.
Figure 3:
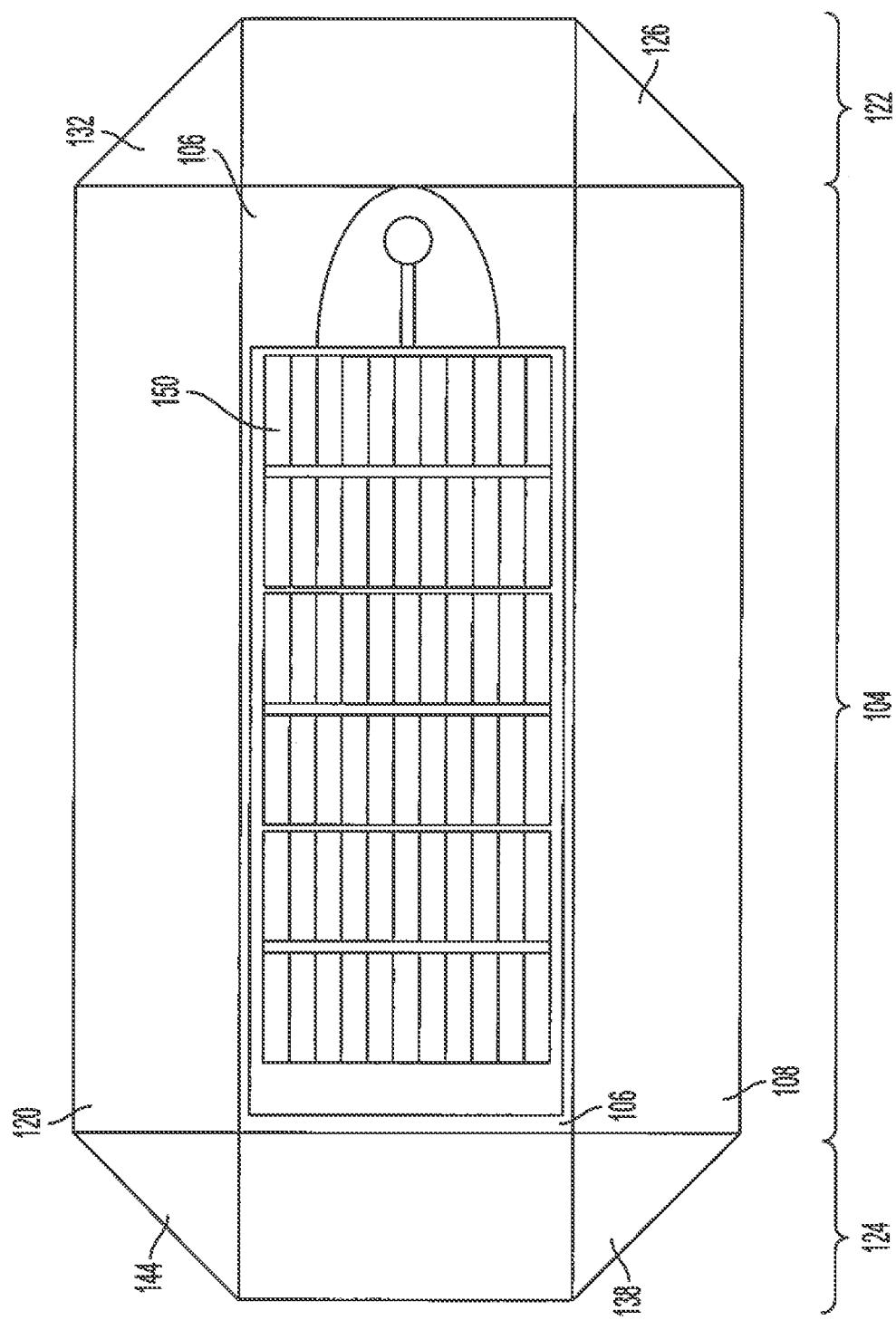
FIG. 3 illustrates a top view of the mosquito agitator in accordance with one embodiment of the present invention.
Figure 4:
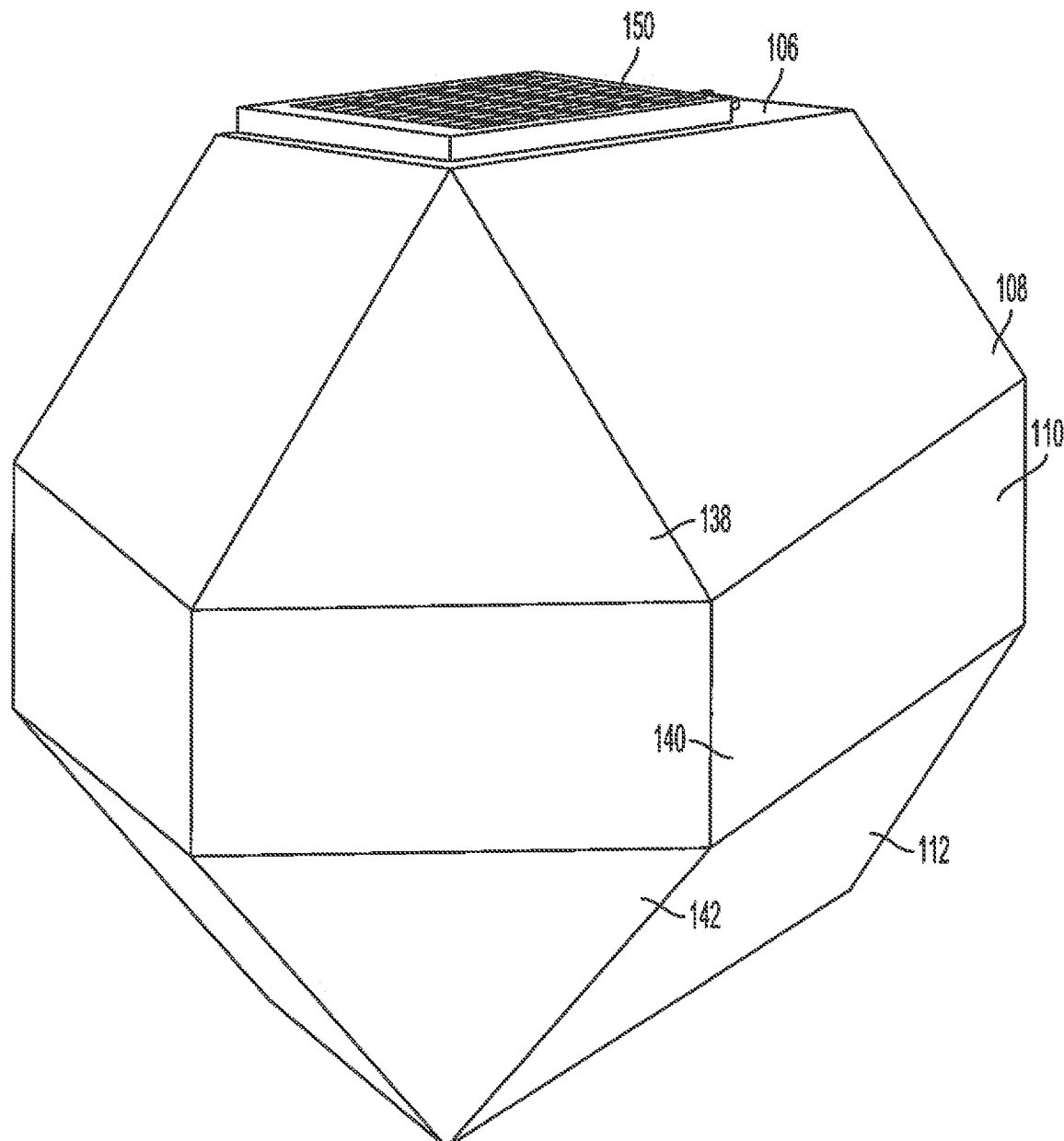
FIG. 4 illustrates a front perspective view of the mosquito agitator in accordance with one embodiment of the present invention.

FIGS. 1-4 provides views of the mosquito agitator in accordance with at least one embodiment of the present invention. FIG. 1 illustrates a side view of a mosquito agitator in accordance with one embodiment of the present invention. FIG. 2 illustrates a longitudinal view of the mosquito agitator in accordance with an embodiment of the present invention. FIG. 2, in particular, illustrates the port side of the mosquito agitator. FIG. 2 further illustrate that the mosquito agitator includes a hull 102 that comprises the stem hull section, 122, center hull section, 104, and bow hull section 124. FIG. 3 illustrates a top view of the mosquito agitator in accordance with one embodiment of the present invention, and in particular, illustrates that the top view of the hull 102. The top view of the stem hull section 122, center hull section, 104, and bow hull section 124 as illustrated in FIG. 1 are also seen in FIG. 3. FIG. 4 illustrates a front perspective view of the mosquito agitator in accordance with one embodiment of the present invention.

Together, a person of ordinary skill in the art would appreciate that the mosquito agitator includes 18 sidewalls or panels, which may be squares or rectangular in shape, and 8 triangular sidewalls or panels. The sidewalls are coupled together to form the hull 102 of the mosquito agitator system illustrated in FIGS. 1-4 in accordance with one embodiment of the present invention. In at least one embodiment, the hull forms a rhombicuboctahedron, modified rhombicuboctahedron geometric shape or variations thereof. When partially submerged, the number of panels that are angled at various angles may maximize the force and distance of the ripples created by the mosquito agitator.

Further details will now be described with respect to the hull 102 of the mosquito agitator system and will be discussed with reference to FIGS. 1-4. From the front view illustrated in FIG. 2 and the longitudinal view of FIG. 1, a person of ordinary skill in the art would appreciate that the hull 102, in embodiments of the present invention, includes a sidewalls 106, 108, 110, 112, 114, 116, 118, and 120 that are arranged to form an octagon of the center hull section 104 from the front perspective (FIG. 1). The panels thus may be arranged radially around an axis that extends from the front (bow) of the device to the back (stern) of the device. As illustrated, sidewalls 106 and 114 and similarly, 110 and 118 are parallel with one another and sidewalls 106 and 114 are perpendicular to sidewalls 110 and 118. Each of the sidewalls may be coupled to one another through various means. In at least one embodiment, the hull is made up of one or more sheets that have been formed to comprise the sidewalls illustrated therein. Thus, in these embodiments, the panels are not individual components that am couple together but may be a single or more sheets of materials that have been modified to a given shape. While FIG. 2 illustrates that each of the side walls 106, 108, 110, 112, 114, 116, 118, and 120 are of substantially equal in length, it should be appreciated that in other embodiments of the present invention the edges of the sidewalls may be in other lengths.

As further illustrated in FIG. 1, the stern hull section 122 includes sidewalls 126, 128, 130 (visible) and 132, 134, 136 (not visible), and the bow hull section 124 is depicted in the longitudinal view to include walls 138, 140, 142 (visible) and 144, 146, and 148 (not visible). Thus, sidewalls 126, 128, 130, 132, 134, 136, 138, 140, 142, 144, 146 and 148 are arranged radially around an axis that extends from the left (port) of the device to the right (starboard) of the device. Together the sidewalls 126, 128, 130, 138, 140, and 142, along with sidewalls 116, 118, and 120 of the center hull section, forms a longitudinal cross section of the mosquito agitator that is octagonal in shape. In addition, as seen in FIG. 3, sidewalls of the bow hull section 124, sidewalls 108 and 120 of the center hull section 104, sidewalls of the stem hull section 122, similarly form an 8-sided top cross section of the mosquito agitator, thereby forming a top cross section of the mosquito agitator that is octagonal in shape.

The hull 102 of the mosquito agitator, in one embodiment, is made up of aluminum, steel, or other alloys. In one embodiment, a form of aluminum alloy is used because it is lightweight, low costs, rust-resist and is environmentally friendly. However, it should be appreciated that the present invention may utilize other types of metals or alloys in based on various requirements. At least the coupled panels that are submerged, when placed in water, form a waterproof surface. In yet another embodiment, the entire hull is waterproof by applying a waterproofing sealer between each panel, such as silica-based sealers.

In one embodiment, one or more sidewalls of the hull may be or may include one or more removable or detachable panel that allows for access to the internal components of the mosquito agitator.

As illustrated in FIGS. 1-4, the mosquito agitator further includes one or more solar panels 150. In one embodiment, the solar panels are coupled to one or more sidewalls of the hull. As illustrated in FIG. 4, one or more solar panels may be coupled to the top sidewall 106. Solar panels 150 may also be coupled to one or more of the other sidewalls. By placing solar panels in other sidewalls making up the hull 102 of the mosquito agitator, including, for example, sidewalls 108 and 120, solar panels may be placed at different angles, thereby maximizing the collection of power even if the sun is low on the horizon or there are other blockages that impede the collection of energy from solar panels coupled to the top sidewall alone. The solar panels 150 may replace one or more sidewalls or partial sidewalls thereof. In at least one embodiment, the mosquito agitator further includes a photon concentrator to increase light or photon coupling. For instance, the photon concentrator may be a dome concentrator that is coupled to the top of the solar panels.

In at least one embodiment, the mosquito agitator may further include one or more anchor. Using the anchor, the device may ensure that a device may stay in the location that it was initially placed within the body of water, such as where the user would like to combat the growth of larvae. While the anchor mechanism should ensure that the mosquito agitator stay in one place, it must not disturb the ability of the mosquito agitator to create water ripples/waves that allow for the device to disrupt the development of the larvae and laying of the eggs initially.

Figure 5A:
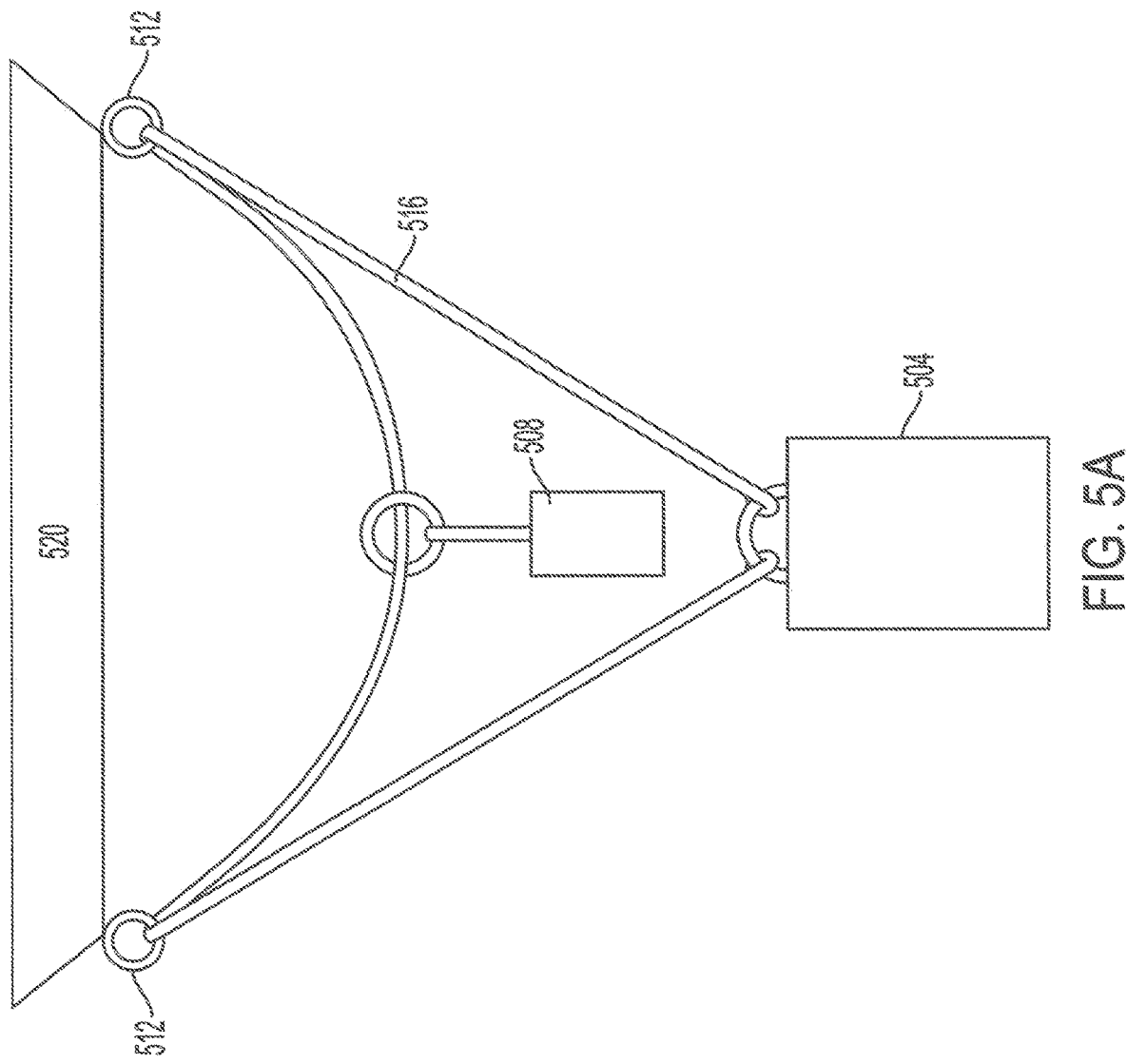
FIG. 5A illustrates an anchor mechanism in accordance with one embodiment of the present invention.

FIG. 5A illustrates an anchor mechanism in accordance with one embodiment of the present invention. Anchor mechanism includes an anchor 504, counterweight 508, slack loops 512 and string 516. The slack loops 512 are coupled to the hull 520 and accepts the string 516 to freely move along its longitudinal axis. The string 516 is connected to anchor 504 and counterweight 508. Counterweight 508 weighs less than the anchor 504 by a predetermined amount so as to optimally allow the mosquito agitator to stay in place in the body of water, but, at the same time, allow for the movement of the hull rotationally, vertically, and so on. In application, the anchor mechanism allows the hull to free move vertically and rotationally with minimal constraints from the anchor.

Figure 5B:
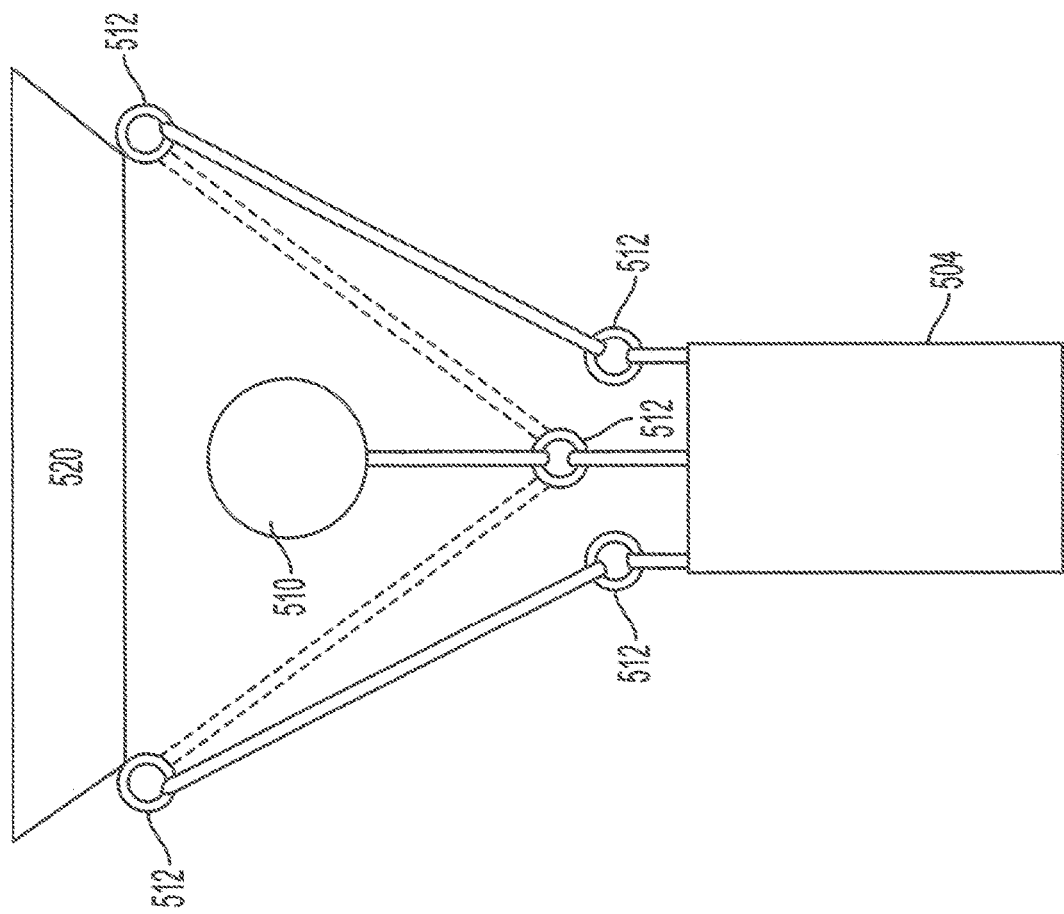
FIG. 5B illustrates an anchor mechanism in accordance with another embodiment of the present invention.

FIG. 5B illustrates an anchor mechanism in accordance with another embodiment of the present invention. Similar to FIG. 5A, the anchor mechanism includes an anchor 504, slack loops 512 and string 516. Instead of a counterweight, the embodiment depicted in FIG. 5B illustrated that a flotation device 510 may be used that pulls the connected string in an upward direction. The amount of pull that the flotation device may provide may vary depending based on the size and may be selected so as to pull an optimal amount that will allow the mosquito agitator to be anchored to its location. At the same time, the anchor mechanism allows the hull to free move vertically and rotationally with minimal constraints from the anchor.

Figure 11:
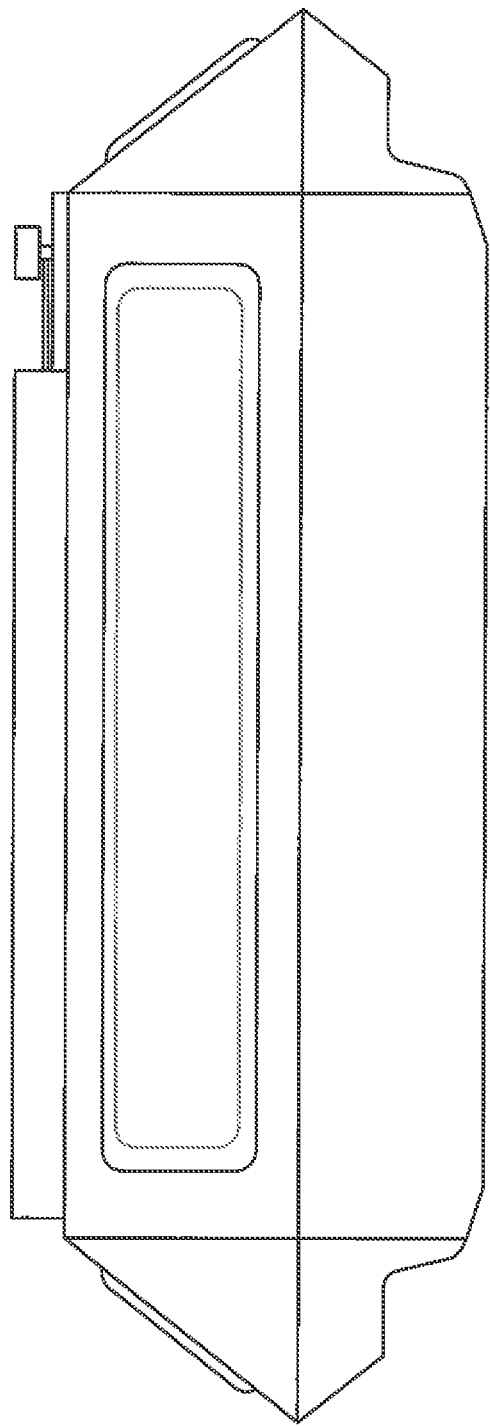
FIG. 11 illustrates a side view of a mosquito agitator in accordance with one embodiment of the present invention.
Figure 12:
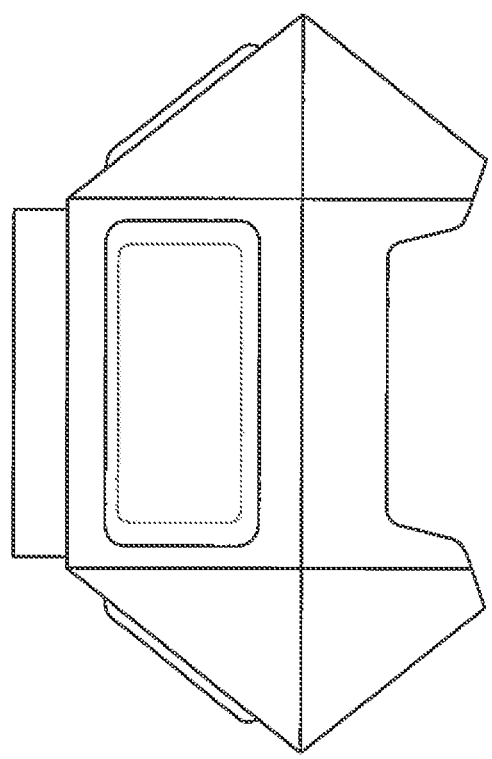
FIG. 12 illustrates a longitudinal view of the mosquito agitator in accordance with an embodiment of the present invention.

While FIGS. 1-4 herein depict a mosquito agitator device comprising a particular hull shape, other shapes of the device may also be use and within the conceived scope of the inventors' invention. FIGS. 11-12, for example, illustrates a hull in accordance with another embodiment of the invention. As illustrated in these figures, the hull's bottom is not flat. Rather, the hull's bottom is convex around an axis that extends from the bow of the device to the stem of the device. When viewed from the bow of the device (FIG. 11), the hull extends outwardly on the left and right side of the hull while the center section of the bottom of the hull is convex. This configuration may provide for better stability and prevent the device from capsizing in rough water.

Figure 6:
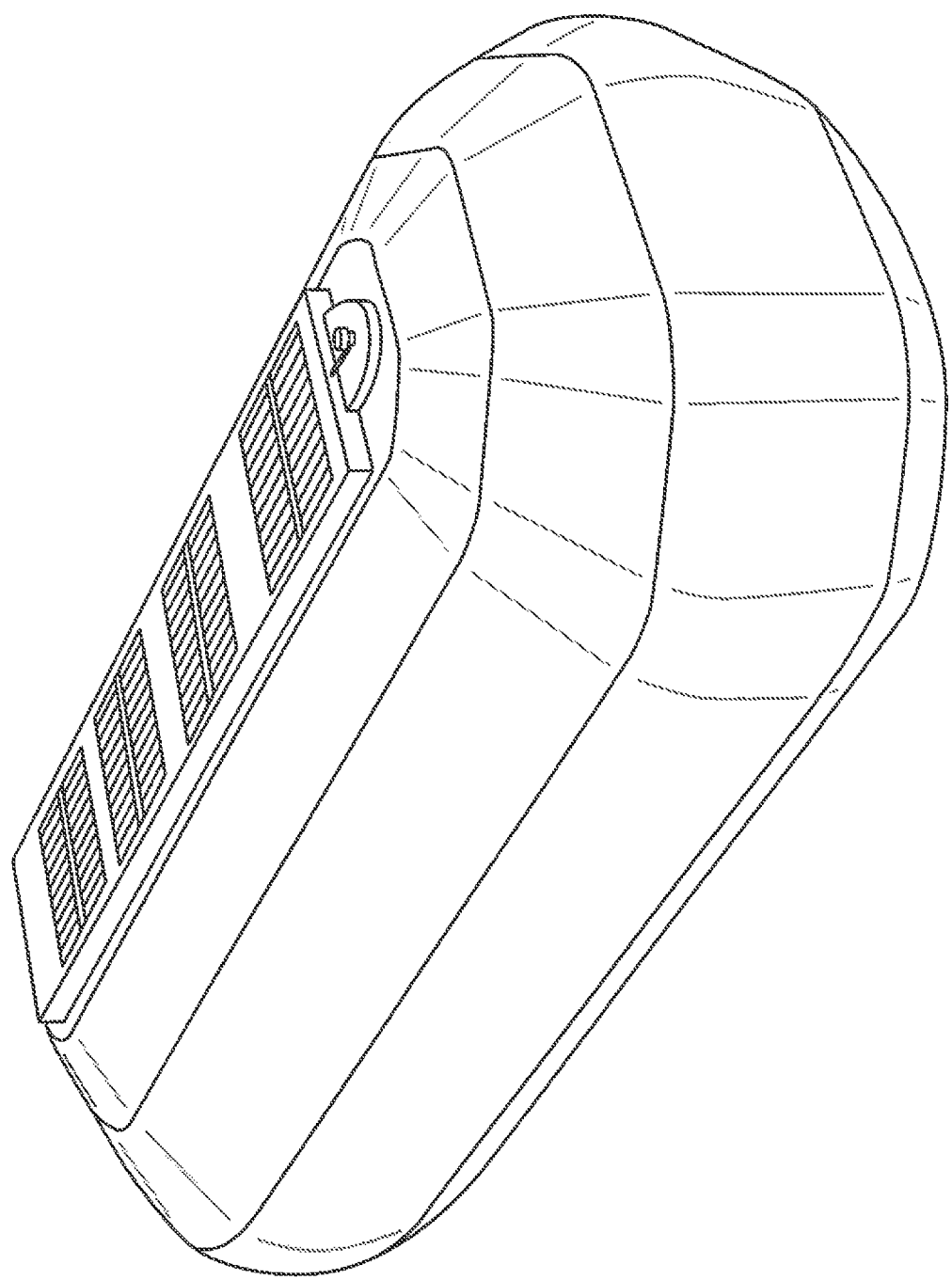
FIG. 6 illustrates a mosquito agitator in accordance with an embodiment of the present invention.

FIG. 6 illustrates a mosquito agitator in accordance with another embodiment of the present invention with a hull that includes a cylindrical center hull section and a fore and bow hull sections that are each dome in shape. Solar panels may be placed completely around or at least partially around the cylindrical center hull section.

Figure 7:
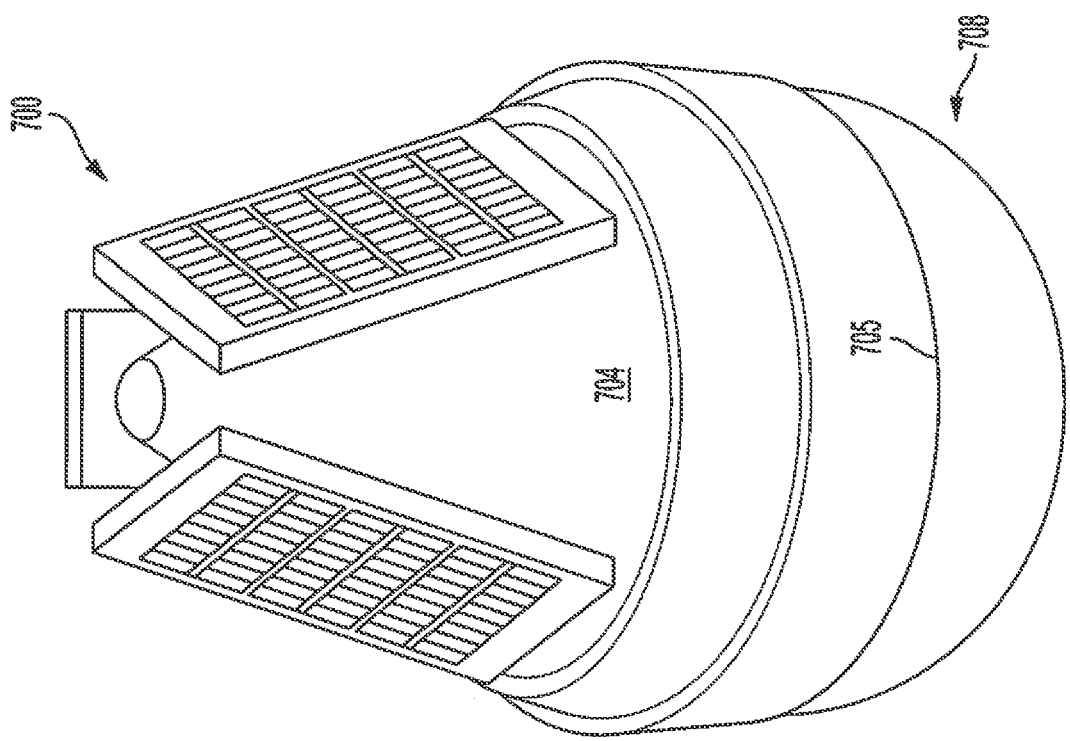
FIG. 7 illustrates another mosquito agitator in accordance with another embodiment of the present invention.

FIG. 7 illustrates yet another mosquito agitator in accordance with another embodiment of the present invention, the mosquito agitator including a hull 700 that is made up of an upper hull section 704 and a bottom hull section 708. In at least one embodiment, the upper hull section 704 may be cone in shape that extends in the vertical axis to a circular edge 705. The circular edge 705 may be coupled to the bottom hull section 708, which is a dome-like shape. In embodiments of the presentation invention, when the hull 700 is placed in water, the bottom hull section 708 may be partially or entirely submerged underwater. In certain embodiments, the shape of the upper hull portion 704 and the bottom hull section 708 forms a tear drop shape. Solar panels may be placed completely or partially around the upper hull section 704.

Figure 8:
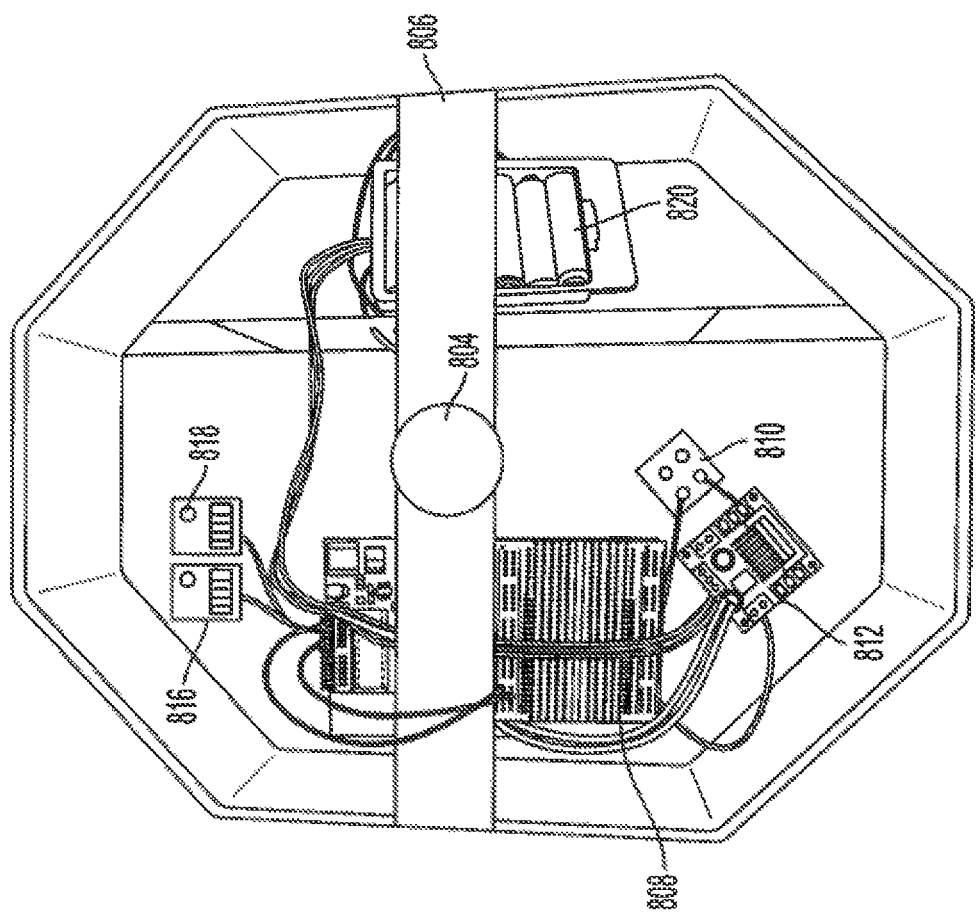
FIG. 8 illustrates a top cross section view of the mosquito agitator that further illustrates the internal components of the mosquito agitator.

FIG. 8 illustrates a top cross section view of the mosquito agitator that further illustrates the internal components of the mosquito agitator. The mosquito agitator, in particular, includes a motor 804, a horizontal cross beam 806, a controller 808, voltage sensor 810, accelerometer 812, temperature sensor 816, humidity sensor 818, and one or more batteries 820.

In one embodiment, the controller 808 may be a programmable microcontroller, CPU or other processing device that may be configured to control the mosquito agitator system. In one embodiment, the controller 808 is an Arduino programmable controller. The controller 808 may be coupled to a voltage sensor 810, which is used to detect and measure AC and/or DC voltage levels. When the presence of voltage is detected, the sensor 810 may provide an output in the form of analogue voltage signals, current levels, frequency and modulated frequency outputs or audible sounds. When coupled to the controller 808, the voltage sensor may ensure that the voltage transmitted to the motor is consistent and detects power failure. The voltage powering the Arduino will supply enough power to operate the voltage sensor, the controller and the sensors 812, 816 and 818. In one embodiment, if the voltage sensor detects that the system has low or no active voltage, a notification may be transmitted to the owner of the system, through one or more communication means, such as Wifi or cellular connection.

The motor 804, in one embodiment, is a gearmotor that is coupled to an offset, non-symmetric mass attached to the shaft of the motor. When voltage is applied to the motor, the motor rotates, the centripetal force of the offset mass is asymmetric, resulting in a net centrifugal force, and this causes a displacement of the motor. With a high number of revolutions per minute, the motor is constantly being displaced and moved by these asymmetric forces. Because the motor is coupled to the hull, e.g., via the horizontal cross beam, the rotation of the counterweight similarly causes the hull to be displaced, e.g., to vibrate and thereby cause water ripples to be created outward from the mosquito agitator. In at least one embodiment, the motor 804 and the offset mass is an eccentric rotating mass vibration motor, or ERM. Other vibration motors known in the art may be utilized in other embodiments of the present invention. In addition, larger masses may be utilized to cause greater vibrations, and larger water ripples outward from the hull. In other embodiments, other techniques may be used in conjunction with or in replacement of the vibrating mechanism described herein. FIG. 16, for instance, illustrates a motor 1604 coupled to a counterweight 1608. The motor is further attached to an attachment 1612.

Embodiments may utilize a microcontroller to rotate a gearmotor with a counterweight to create disturbances on the water's surface Batteries 820 may be directly or indirectly connected to the solar panel(s) found on the exterior of the hull. Thus, the solar panels may collect solar energy available when available and store the collected energy at the batteries 820. In one embodiment, batteries 820 may be made of one or more rechargeable batteries coupled to the solar panels. Batteries 820 may further include one or more batteries that are replaceable by users. In one embodiment, batteries 820 include Ni—Cd, Ni-MH, or Li-ion batteries.

Accelerometer 812 is and/or may comprise one or more sensors that measures proper acceleration. Single- and multi-axis models of accelerometer may be utilized to detect magnitude and direction of the proper acceleration, as a vector quantity, and can be used to sense orientation, coordinate acceleration, vibration, shock, and falling in a resistive medium. In one embodiment, accelerometer 812 is micromachined microelectromechanical systems (MEMS) accelerometers.

In accordance with at least one embodiment of the present invention, the accelerometer 812's measurement of acceleration may be used to detect the movement of the mosquito agitator on multiple axes. For example, the accelerometer 812 may be used to measure the movement of the mosquito agitator in the body of water. For instance, over a length of time during which measurement are taken, the controller 808 may determine that the mosquito agitator has moved 5 feet north northwest from its original position in the body of water in which it was placed based on the data received from the accelerometer.

The accelerometer may further be used to detect the movement of the device vertically and its rotation. Thus, the device may be able to detect that the mosquito agitator is rocking such that the fore and bow are moving vertically in opposite directions on that the starboard and port sides are moving vertically in opposite directions. Based on such information, the controller 808 may operate in response. For instance, such information may affect the algorithm applied to the motor to vary the frequency and strength of the motor and therefore, affect the ripple created by the device.

Temperature sensor 816 may detect the temperature of the water and/or the ambient temperature. In one embodiment, the temperature sensor may be placed externally to the hull to measure the temperature of the water and may connect to the controller stored internally to provide such information in real time. The temperature information provided therefrom may be used by the controller in determining when to run one or more agitation algorithms. For instance, because mosquitoes generally do not lay eggs or develop well in colder temperatures, the device may not execute any mosquito agitation algorithms if the temperature sensor 816 determines that the water temperature is below a predetermined temperature.

Humidity sensor 818 may measure the ambient humidity. In one embodiment, the temperature sensor 816 and humidity sensor 818 may together be one or more device. The humidity information provided therefrom may be used by the controller in determining when to run one or more agitation algorithms. For instance, because mosquitoes may be more likely to lay eggs or develop well in higher humidity environments, the controller may execute its agitation algorithms more frequently or for longer time periods.

In at least one embodiment, the mosquito agitator may one or more sensors or system. In one embodiment, the device includes one or more Global Positioning System modules that could assist with determining the location of the mosquito agitator. This may help a user to locate the device if the device has moved since its initial placement. In one embodiment, the device may include one or more sensors that detects the current depths of the water, including when the device is near or is currently contacting the bottom of body of water. In one embodiment, the device may utilize infrared, sonar, or other distance sensing modules to accomplish this function.

In at least one embodiment, the mosquito agitator may include one or more modules that facilitates wireless communications. For instance, the device may include one or more modules to receive and transmit wireless information, such as via Wifi, cellular network, Bluetooth, near field communication, and other communication means. Using this wireless module, the device may communicate notifications or logged data information to one or more remote systems and/or devices. For instance, the device may transmit information gathered from all of the sensors to provide real-time temperature information, humidity information, how often the agitation algorithms are being executed, movement information, voltage information, battery information, solar panel information, location information, etc. Other data from sensors and modules described herein may be collected and communicated via the wireless communications feature.

The controller 808 may execute one or more mosquito agitation algorithms in accordance with embodiments of the present invention. In at least one embodiment, the controller 808 may execute an algorithm to cause the motor 804 to run for 5 mins every 6 hours to detach egg rafts or mosquito pupae from the water's surface. The mosquito agitator may operate many other algorithms depending on the detected environment to maximize its effectiveness in agitating the development cycles of the pupae and to prevent the laying of the eggs altogether. For instance, based on detected low temperature or humidity, the mosquito agitator may operate to run for 10 minutes every 8 or 12 hours. Conversely, if the device detects that it is low on battery, the controller may only operate to run every 5 minutes every 24 hours until it is able to collect more solar energy such that the amount of energy conserved in the battery 820 meets a minimum threshold. In yet another algorithm, the controller may to not operate at all when it detects that the device is moving vertically and/or rotating greatly, thereby indicating that there may be a storm or the water is highly disturbed already so that little benefit is served by running the mosquito agitation.

Apart from the mosquito agitation algorithms, the controller may further execute one or more software modules or instructions that control how the device determines which mosquito agitation algorithm to use, to receive and interpret sensor information, to communicate with the components and external systems/devices, and perform other functions described herein. In at least one embodiment, the controller 808 may operate in itself or in connection with an external server, to learn over time, the optimal algorithms to operate to maximize the effectiveness of the mosquito agitator based on the environment in which the device is being used. Thus, the above-described algorithms may be modified overtime automatically by the system, e.g., changing from 5 minutes every 6 hours to 7.6 minutes every 6.5 hours.

Controller 808 may further detect when one or more aspects of the mosquito agitator is malfunctioning or is operating inefficiently. In one embodiment, the controller 808 may detect if the solar panels are obstructed or dirty. It may detect this status by comparing the current output against historical collection. It may also compare the output of one panel against the other panels in the mosquito agitator and determine that one panel is receiving much less solar energy than the other panels. It may send a notification to a user's smartphone or an external system to notify the user to clean the panel(s).

In another embodiment, the mosquito agitator may utilize the depth sensing functionality to determine when the device may have run aground. In one embodiment, the depth sensing module may be one or more mechanical switches (e.g., a pin or button) that may be automatically triggered or depressed when the mosquito agitator makes contact with the bottom of the body of water. In one embodiment, if the controller 808 detects that the hull has made contact with the bottom for a prolonged period of time (e.g., more than 5 seconds), then it may deem that the device has run aground and may send a notification to the owner's smartphone or an external system.

In one embodiment, the mosquito agitator may collect and transmit images of the surround air and water using an onboard photographic sensor, or camera. The images may be transmitted to a scientist via computer or cell phone application or remote controller, where the scientist can analyze the image and identify the type of mosquitoes present at the site of the mosquito agitator. The images may also be used to determine when to activate one or more mosquito agitation algorithm.

In one embodiment, the mosquito agitator may detect when the battery is low, the motor is malfunctioning, or that sensors are not collecting adequate or any information. The controller may identify potential issues based on one or more information logged by the sensors and components of the mosquito agitator. The controller may then cause notification(s) to be transmitted to a user's smartphone or an external system to notify the user of the potential issue(s) and possible ways to fix the problem(s).

Figure 9:
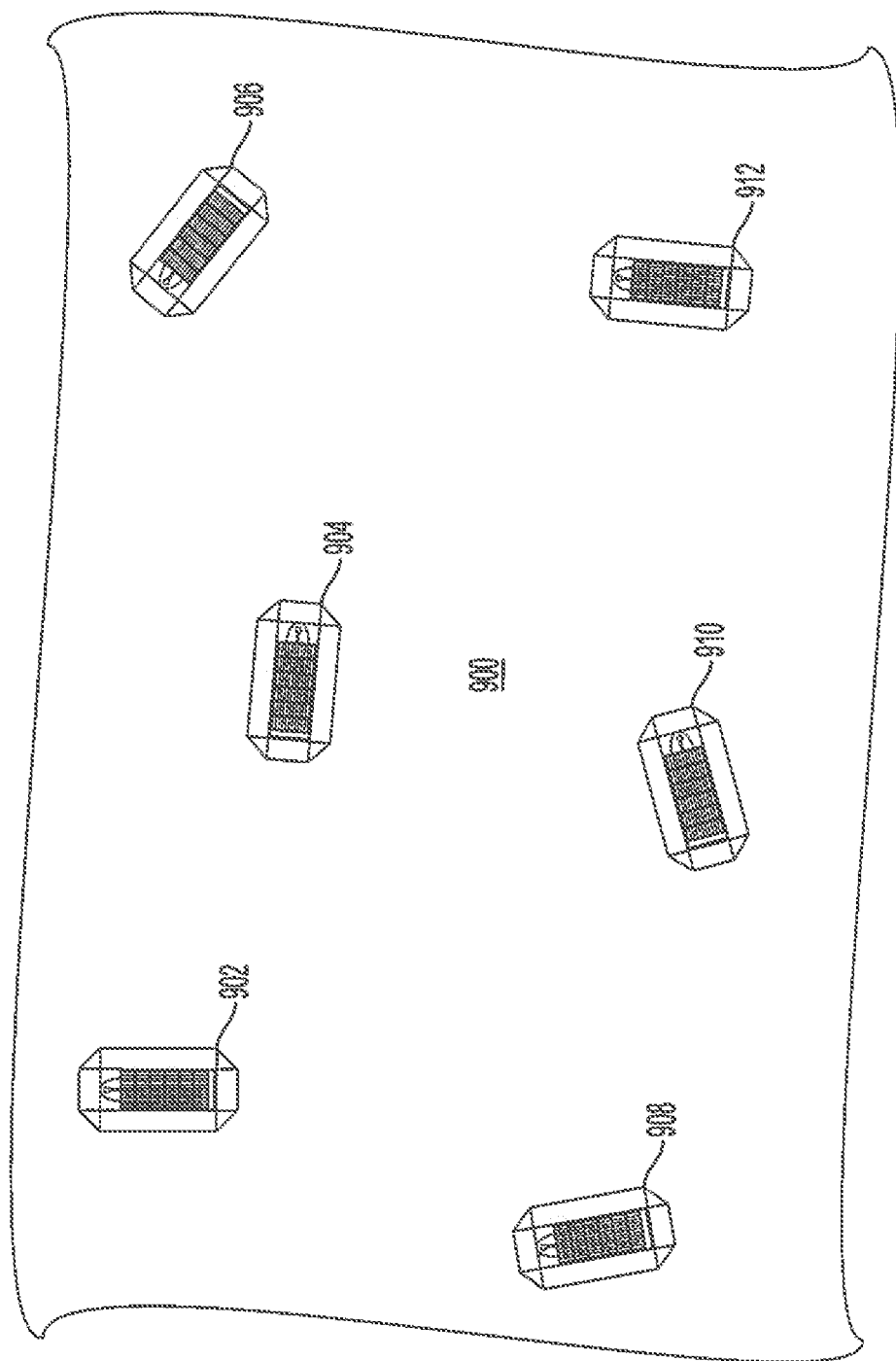
FIG. 9 illustrates a mosquito agitator system in accordance with an embodiment of the present invention.
Figure 10:
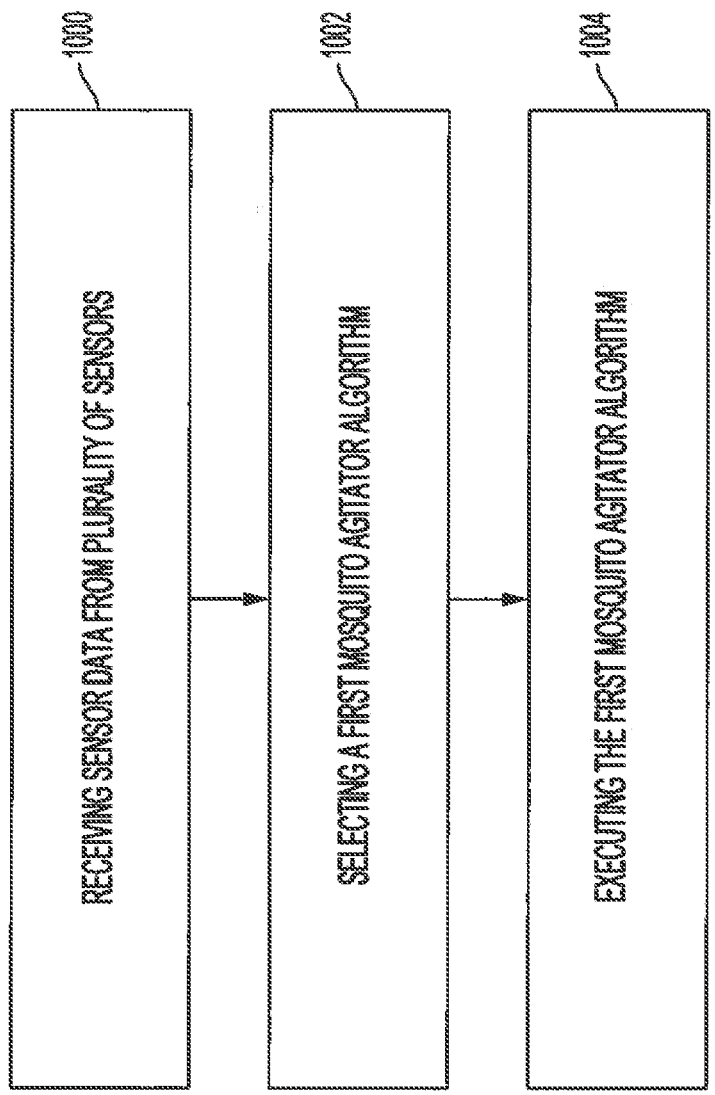
FIG. 10 illustrates a method for mosquito agitation in accordance with one embodiment of the present invention.

In at least one embodiment, the mosquito agitator may operate in conjunction with other mosquito agitators in accordance with one embodiment of the present invention. For instance, multiple mosquito agitator devices may be placed in a body of water and spaced evenly from one another so as to maximize the disturbance to the laying of the eggs and/or the development of the pupae for the entire body of water. FIG. 9 illustrates one application comprising a plurality of mosquito agitator devices 902, 904, 906, 908, 910, and 912 in a body of water 900, which, in this case, is a large pond. In one embodiment, sensor information collected from one device may be wireless communicated with the other devices and used by the other devices to maximize effectiveness of the devices. For instance, one device may determine early on that a storm is coming into region including the body of water may communicate this information to the other devices, which may cause those devices to stop executing its current mosquito agitation algorithm. Log information may be further collected from the plurality of devices. Based on the log, a user may determine that a portion of the large body of water is frequently subject to waves while in other portions, the water remains stagnant. Using this information, a user may optimize the placement of the devices to those areas where the body is stagnant over other areas.

In at least one embodiment, each of the mosquito agitator may communicate with one or more remote systems. Such remote systems may be located in the cloud and may operate to receive, collect, and analyze data received from each of the mosquito agitator. In addition, a user, e.g., administrator, may access the remote systems via a computing device, e.g., a laptop or smartphone, to view information collected and analyzed by the remote systems and to control the one or more mosquito agitator. In one embodiment, the user may remotely control the mosquito agitator to perform select mosquito agitator algorithms, to shut down, to move, and to perform any of the functions described herein.

In yet another embodiment, the user may access the remote systems to configure one or more rules that the remote systems and/or the one or more mosquito agitator may follow. For instance, the user may access one or more user interface provided by the remote systems that allow the user to configure when the user's smartphone should receive a notification, which as described above, may include any number of scenarios. For instance, the user may be notified whenever a mosquito agitator is activated; when a select algorithm is run; when the mosquito agitator detects that there is low on battery; when the mosquito agitator detects that the motor or voltage is malfunctioning; and others.

Figure 13:
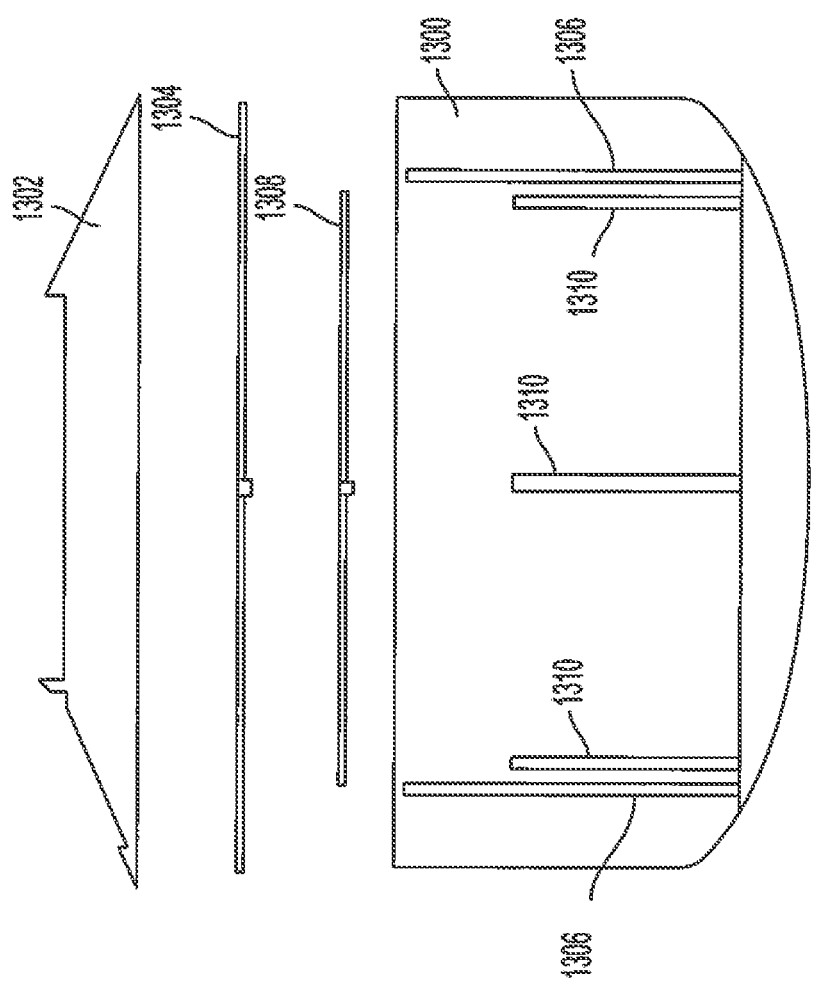
FIG. 13 illustrates a front/longitudinal view of the mosquito agitator depicting a cross section in accordance with an embodiment of the present invention.

The components depicted in FIG. 8 may be placed or arranged in other configurations in accordance with embodiments of the present invention. For example, the components may be arranged on multiple levels within the hull. In one embodiment, the internal of the hull may be comprised of multiple levels, or shelves, to which the components may be placed or coupled. For instance, FIG. 13 illustrates an exploded front/longitudinal view of a cross section of the mosquito agitator in accordance with an embodiment of the present invention. FIG. 13, in particular, includes a hull 1300, lid 1302, an upper internal shelf 1304, lower internal shelf 1308, upper shelf bracket 1306, and lower shelf bracket 1310. As illustrated in FIG. 13, an upper internal shelf 1304 may be held up by upper shelf brackets 1306 whereas the lower shelf 1308 may be held up by lower shelf brackets 1310. The lid 1302 are attachable to the hull and the shelves 1306 and 1308 may be replaceable coupled to the shelves so as to allow a user to individually remove the shelves to access components underneath.

Figure 15:
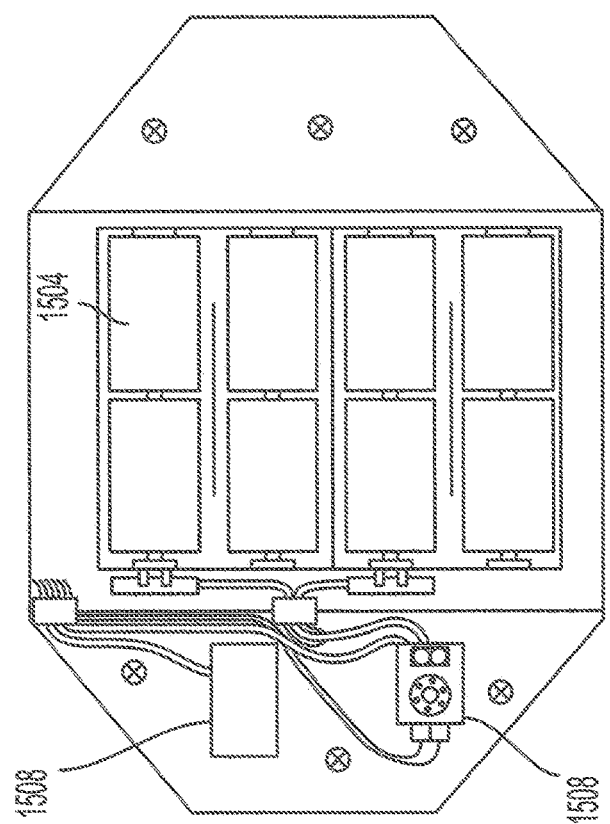
FIG. 15 illustrates a top view of a lower internal shelf in accordance with an embodiment of the present invention.
Figure 14:
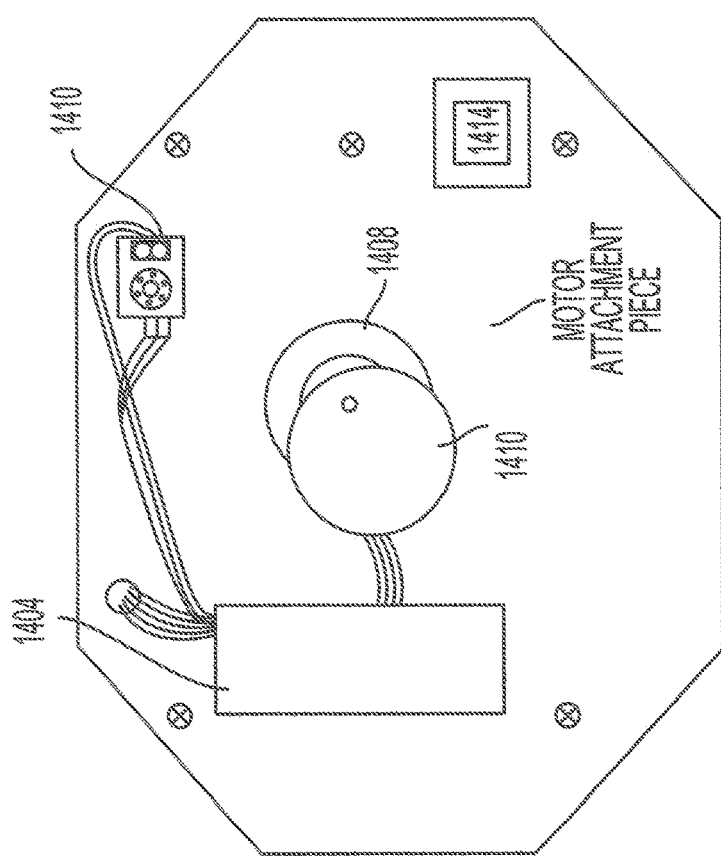
FIG. 14 illustrates a top view of an upper internal shelf in accordance with an embodiment of the present invention.

FIG. 14 illustrates an upper internal shelf in accordance with an embodiment of the present invention. FIG. 15 illustrates a lower internal shelf in accordance with an embodiment of the present invention. As illustrated in FIGS. 14-15, the internal of the hull may include a controller 1404 that is connected to a voltage sensor 1410 and motor 1408, which is further connected to counterweight 1410. These components may be coupled to the upper internal shelf 1402. In addition, the upper internal shelf 1402 may further be include a GPS unit 1414 as well as other sensors and components described herein. FIG. 15 further illustrates that the lower internal shelf 1500 may contain the battery 1504, a accelerometer 1508, and a voltage sensor 1508.

FIG. 9 illustrates a method for mosquito agitation in accordance with one embodiment of the present invention. The method includes steps of receiving sensor data from a plurality of sensors, at 1000, and selecting, using a controller, a first mosquito agitator algorithm for execution by the controller, at 1002. Furthermore, the controller executes a first mosquito agitator algorithm to activate the motor in accordance with the first mosquito agitator algorithm, at 1004, wherein the activation causes a hull of the device to create a plurality of water ripples in the body of water to disrupt the development of mosquito larvae.

The systems and methods described above in reference to FIGS. 1-13, may be implemented in hardware, or hardware combined with one or both of software and/or firmware. For example, the functionality described herein, including the receiving of sensor information, the analysis of sensor information, the selection of the mosquito agitator algorithms, the execution of the algorithms, as well as other controller functionalities, may be may be implemented in one or more SoCs (system on chip). An SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Controllers described herein includes one or more processors, referred to as processor circuit, a system memory, and a bus that couples various system components including system memory to processor circuit. Processor circuit is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit may execute program code stored in a computer readable medium, such as program code of operating system, application programs, other programs, etc. Bus represents one or more of any of several types of bus structures, including a memory bus or memory controller, a peripheral bus, an accelerated graphics port, and a processor or local bus using any of a variety of bus architectures. System memory includes read only memory (ROM) and random access memory (RAM). A basic input/output system (BIOS) is stored in ROM.

Controllers described herein may also have one or more of the following drives: a disk drive for reading from and writing to a hard disk or a solid state drive, a magnetic disk drive for reading from or writing to a removable magnetic disk, and an optical disk drive for reading from or writing to a removable optical disk such as a CD ROM, DVD ROM, or other optical media. Hard disk drive, magnetic disk drive, and optical disk drive are connected to bus by a hard disk drive interface, a magnetic disk drive interface, and an optical drive interface, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system, one or more application programs, other programs, and program data. Application programs or other programs may include, for example, computer program logic (e.g., computer program code or instructions) for implementing the systems described above techniques described in reference to FIGS. 1-9.

A user may enter commands and information into the computing device through input devices such as keyboard and pointing device. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit through a serial port interface that is coupled to bus, but may be connected by other interfaces, such as a parallel port, game port, or a universal serial bus (USB).

A display screen is also connected to bus via an interface, such as a video adapter. Display screen may be external to, or incorporated in, computing device. Display screen may display information, as well as being a user interface for receiving user commands and/or other information (e.g., by touch, finger gestures, virtual keyboard, etc.). In addition to display screen, computing device may include other peripheral output devices (not shown) such as speakers and printers.

The controller may be connected to a network (e.g., the Internet) through an adaptor or network interface, a modem, or other means for establishing communications over the network. Modem, which may be internal or external, may be connected to bus 1606 via serial port interface, or may be connected to bus using another interface type, including a parallel interface.

As used herein, the terms "computer program medium," "computer-readable medium," and "computer-readable storage medium" are used to generally refer to physical hardware media such as the hard disk associated with hard disk drive, removable magnetic disk, removable optical disk, other physical hardware media such as RAMs, ROMs, flash memory cards, digital video disks, zip disks, MEMs, nanotechnology-based storage devices, and further types of physical/tangible hardware storage media (including system memory). Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media.

As noted above, computer programs and modules (including application programs and other programs) may be stored on the hard disk, magnetic disk, optical disk, ROM, RAM, or other hardware storage medium. Such computer programs may also be received via network interface, serial port interface, or any other interface type. Such computer programs, when executed or loaded by an application, enable computing device 1600 to implement features of embodiments discussed herein. Accordingly, such computer programs represent controllers of the computing device.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

Embodiments described herein may also be implemented and/or executed via virtual or emulated hardware (e.g., virtual machines) and/or other environments, including, but not limited to, a cloud-computing based environment (e.g., Microsoft Azure by Microsoft Corporation®), such as the cloud-computing based environment described above.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

The invention claimed is:

1. A device to disrupt the development of mosquito larvae, the system comprising:
    a motor coupled to a rotating shaft that is coupled to a non-symmetric mass;
    a hull coupled to the motor;
    one or more solar panels coupled to the hull for capturing solar energy into electricity;
    a plurality of sensors;
    a controller coupled to at least the motor, wherein the controller is configured to perform at least the following functions:
        receive sensor data from the plurality of sensors;
        select a first algorithm for execution;
        execute the first algorithm to activate the motor in accordance with the first algorithm, wherein the activation causes the hull to create a plurality of water ripples in a body of water to disrupt development of larvae.

2. The device of claim 1, wherein the plurality of sensors including at least one of accelerometer, temperature sensor, humidity sensor, voltage sensor, and depth sensor.

3. The device of claim 1, wherein the first algorithm is selected based on the received sensor data.

4. The device of claim 1, wherein the first algorithm, when executed, causes the hull to create the plurality of water ripples in the body of water for at least five minutes every 12 hours.

5. The device of claim 1, the device further comprising a battery, wherein the controller is further configured to perform at least the following:
determining that battery level of the battery is low;
selecting a second algorithm based on the determination, wherein the second algorithm, when executed, causes the hull to create a plurality of water ripples in the body of water less frequently than the first algorithm in a predetermined period of time.

6. The device of claim 5, wherein the controller is further configured to perform at least the following: communicate a notification to a computing device.

7. The device of claim 1, wherein the first algorithm is selected based on a remote selection received from a remote computing device.

8. The device of claim 1, wherein the hull comprises of an aluminum alloy.

9. The device of claim 1, wherein the hull having a modified rhombicuboctahedron geometric shape.

10. The device of claim 1, wherein hull having at least 18 quadrilateral sides and 8 triangular sides.

11. A method of disrupt the development of mosquito larvae using at least a device at least partially submerged in a body of water, the method comprising:
receiving sensor data from a plurality of sensors;
selecting, using a controller, a first algorithm for execution by the controller;
executing the first algorithm to activate the motor in accordance with the first algorithm, wherein the activation causes a hull of the device to create a plurality of water ripples in a body of water to disrupt development of mosquito larvae.

12. The method of claim 11, wherein the plurality of sensors including at least one of accelerometer, temperature sensor, humidity sensor, voltage sensor, and depth sensor.

13. The method of claim 11, wherein the first algorithm is selected based on the received sensor data.

14. The method of claim 11, wherein the first algorithm, when executed, causes the hull to create the plurality of water ripples in the body of water for at least five minutes every 12 hours.

15. The method of claim 11, further comprising:
determining, with the controller, that battery level of a battery is low;
selecting a second algorithm based on the determination, wherein the second algorithm, when executed, causes the hull to create a plurality of water ripples in the body of water less frequent rate than the first algorithm over a predetermined period of time.

16. The method of claim 11, further comprising: communicate a notification to a computing device.

17. The method of claim 11, wherein the first algorithm is selected based on a remote selection received from a remote computing device.

18. The method of claim 11, wherein the hull comprises of an aluminum alloy.

19. The method of claim 11, wherein the hull having a rhombicuboctahedron geometric shape.

20. The method of claim 11, wherein hull having at least 18 quadrilateral sides and 8 triangular sides.

* * * * *